United States Patent [19]

Combs et al.

[11] 4,221,004

[45] Sep. 2, 1980

[54] ADJUSTABLE ULTRASONIC LEVEL MEASUREMENT DEVICE

[75] Inventors: Charles M. Combs, Los Angeles; Perry H. Goodwin, Jr., Orange, both of Calif.

[73] Assignee: Robertshaw Controls Company, Richmond, Va.

[21] Appl. No.: 930,667

[22] Filed: Aug. 3, 1978

[51] Int. Cl.³ ............................................. G01S 15/18
[52] U.S. Cl. ................................ 367/114; 367/112; 367/137; 367/900; 367/902; 367/908; 73/290 V
[58] Field of Search .................... 340/1 L; 73/290 V; 367/95, 97, 112, 114, 900, 908

[56] References Cited

U.S. PATENT DOCUMENTS

| | | | |
|---|---|---|---|
| 3,184,969 | 5/1965 | Bolton | 73/290 V |
| 3,757,285 | 9/1973 | Ferre | 340/1 C |
| 3,985,030 | 10/1976 | Charlton | 73/290 V |
| 4,000,650 | 1/1977 | Snyder | 73/290 V |
| 4,114,441 | 9/1978 | Magri | 73/290 V |

*Primary Examiner*—Richard A. Farley
*Attorney, Agent, or Firm*—Fulwider, Patton, Rieber, Lee & Utecht

[57] ABSTRACT

An ulrasonic liquid level measurement device is used to measure the depth of a flowing liquid in a channel using an ultrasonic transducer that is positioned out of contact with the liquid and above and directed toward the channel. An ultrasonic burst is directed toward the channel and the reflected echo from the surface of the liquid is returned and sensed by the transducer. The transit time of ultrasonic transmission and echo return is indicative of the liquid level. An adjustable discriminator is provided to specify a maximum liquid level in the channel and a minimum liquid level, which, typically is the floor of the channel. The maximum and minimum levels are adjustable to accomodate variable channel configurations and transducer mounting arrangements. Automatic adjustment is provided to compensate for different cable lengths which may be used to connect the ultrasonic transducer to the transducer driver and receiving section. Temperature compensation is provided to compensate for changes in ultrasonic transmission propogation through ambient air with temperature, and time variable gain amplification is provided to compensate for geometric spreading of reflected ultrasonic energy echo pulses and for air path absorption.

18 Claims, 6 Drawing Figures

ADJUSTABLE ULTRASONIC LEVEL MEASUREMENT DEVICE

BACKGROUND OF THE INVENTION

1. Field of the Invention

The present invention relates to ultrasonic, noncontacting liquid level measurement devices.

2. Description of the Prior Art

In the past, ultrasonic liquid level detectors have employed ultrasonic transducers to both transmit bursts of ultrasonic pulses, and to receive return or echo pulses. The echo pulses are reflected from the liquid interface, or level of liquid in the channel. The transmit time between ultrasonic transmission and the receipt of a reflected echo is indicative of the distance of the transducer from the liquid level. Since the transducer is typically mounted at a predetermined height above the floor of the channel within which the liquid is flowing, this distance is inversely related to the depth of the liquid in the channel.

Upon receipt, the echo signal is typically used to stop a time pulse counter which begins running after the inception of ultrasonic transmission. The counts in this counter are compared with some reference count level corresponding to the physical location of a reference level, such as the floor of the channel. Since the distance between the floor of the channel and the ultrasonic transducer is known, the time interval between pulse transmission and return of an echo from the liquid interface is inversely indicative of the level of the liquid in the channel.

One serious limitation in systems that have heretofore existed to date has been the inflexible nature of their construction. Ultrasonic level detectors have heretofore necessarily been inflexibly constructed for use with a channel of a particular depth and with the ultrasonic transducer mounted at a fixed, predetermined height. Knowledge of the exact parameters in this regard has been required in the construction of conventional ultrasonic liquid level detectors. This has meant that such detectors cannot be provided as a ready made system, but instead are necessarily custom made for a particular use, and once made, conventional ultrasonic level detectors cannot be adjusted to meet a new set of physical operating parameters of channel depth and transducer mounting height.

SUMMARY OF THE INVENTION

The present invention overcomes the deficiencies of the prior art by providing a noncontacting ultrasonic level detection unit which may be adjusted at any time to accomodate different channel depths and different mounting heights of a transducer relative to a channel, within the instrument range. This is accomplished through the use of an adjustable discriminator. The limits of the discriminator define, on the one hand, the floor of a channel or flume in terms of the number of timing pulses which are tabulated between transmission of an ultrasonic burst and the time required for the ultrasonic signal to return from the floor of the channel as an echo. This defines a minimum liquid level or depth which occurs at zero flow when the channel is empty. The other limit of the adjustable discriminator is a maximum liquid level which corresponds to the interval of time required for the transmission of an ultrasonic burst and the return of an echo from the top of the channel. The time pulses counted during this shorter interval correspond to the level of liquid in the channel when the channel is filled to maximum capacity. In this way, maximum and minimum levels are associated with each ultrasonic transmission for which an echo signal is received.

According to the invention, tabulation of timing counts does not even begin until expiration of a time corresponding to the transmission and return interval of an echo reflected from the maximum liquid level. Moreover, the duration of this preliminary interval, or minimum signal transit and reflection time is manually adjustable. Preferably, the adjustment includes a coarse adjustment, which may be a wiper contact movable relative to the various cascaded outputs of the minimum transit and reflection time counter. In addition, a fine adjustment may be provided by varying the frequency of occurrence of timing pulses to the counter. This varies both the required number and the rate of pulses of the timing "clock". The position of the ultrasonic transducer itself may be changed to any level above the maximum liquid level, and may be moved either closer thereto or further therefrom. If the position of the ultrasonic transducer is so altered, the manual adjustments described are performed upon the instrument to re-establish the counting system to display a reference level corresponding to the distance of ultrasonic transducer from the maximum liquid level.

In a similar fashion, the ultrasonic measurement device according to the invention is provided with manual adjustments to vary the occurrence of the minimum level signal. That is, a wiper contact movably positionable in contact with the cascaded binary outputs of another counter is used as a coarse adjustment to compensate for variations in the span or depth differential between the maximum and minimum liquid levels. Again, adjustment of the frequency of timing pulses to the span counting system provides a fine adjustment.

A particularly advantageous feature of the adjustable discriminator so described is that the circuit arrangement of the invention not only defines maximum and minimum reference levels for the purposes of referencing an echo signal in terms of a percentage therebetween, but also such an adjustable discriminator prevents the recordation of extraneous echoes or double reflections which may occur at intervals exclusive of the time "window" during which the system is gated open to receive an echo pulse. As a result, a large portion of extraneous echo reflections are never registered and so do not interfere with the accurate recordation of liquid level in the channel. This is possible because the maximum and minimum levels of the adjustable discriminator not only serve as points of reference for an echo signal, but they also define a time interval or "window" of adjustable duration within which an echo signal must occur if it is to be tabulated as a valid echo reflection.

A further significant feature of the invention is the provision for indicating as an error condition the absence of recordation of valid echo signals over several cycles of ultrasonic transmission. This is achieved by providing a counter which registers the occurrence of each minimum level signal and accumulates such signals until their total reaches a predetermined alarm limit. If this occurs, a warning indicator is illuminated. If valid echo signals are received following ultrasonic transmission, however, the counter is reset by the detection of a valid echo signal to prevent the alarm generating count from accumulating.

Another feature of the invention is that the output of the instrument is adapted to compensate for the attenuation of echo signals depending upon liquid level. Normally, echo signals received from a liquid interface near the maximum possible liquid level will be much stronger than echo signals when the liquid is at a lower level. This is because echo signals, when reflected from the liquid surface near the minimum possible level tend to spread and weaken to a much greater degree than do echo signals which are reflected from a liquid level closer to the ultrasonic transducer. To compensate for this effect, the length of time beginning with the transmitted signal until detection of the echo signal is used to control the gain applied to the echo signal output. That is, a greater time interval, indicating a lower liquid level, is amplified to a greater extent than is a smaller time interval, which is indicative of a higher liquid level. The time dependent gain function applied to the echo signal time pulse count may either be linear or exponential. Preferably, amplification is increased as the square of distance, since attenuation due to spreading of the echo signal increases as the square of distance.

Similarly, it is sometimes useful to alter the echo signal output in a non-linear fashion. The most appropriate function depends upon the channel configuration. For example, when the ultrasonic level flow detector is used at a Parshall flume, amplification of the send echo time signal to the three halves power is appropriate, since the resulting figure is an indication of volume flow at that point in the channel.

Another important feature of the invention is the provision for automatic compensation for variances in the amplitude of signal propagation that occurs during different lengths of cable to connect the transmitter and receiver to the ultrasonic transducer. In the past it was necessary to specify precisely the cable length that was to be employed in order to perform a factory adjustment of an ultrasonic level detector. According to the present invention, however, a cable impedance feedback arrangement automatically senses any change in impedance through the ultrasonic transducer cable, and modifies the amplification applied to the ultrasonic receiver accordingly. This allows the user the flexibility of employing a cable of any length within the range of a compensation circuit. The system will automatically compensate for amplification of the signal from the transmitter to the transducer for such alterations in cable length.

Another feature of the invention is the provision of a built-in time delay between measurement cycles. Thus, when the transducer is located proximate to the maximum liquid level and the actual level of the liquid approaches the maximum, the cyclic intervals between ultrasonic transmissions are kept from becoming too small. Without this feature, the transducer could well be driven too often and beyond its cycling rate, and hence damaged. This feature also keeps the transducer from being updated too frequently to prevent flickering of any visual display.

Other features of the invention include the provision of means to alter the transmitted signal bursts. The duration and amplitude of the pulse bursts of ultrasonic energy may thereby be varied. Adjustments are also provided to compensate for resonance of the ultrasonic transducer. Also, a band pass filter is provided to block ultrasonic energy which is not at the correct frequency. This aids in preventing the recordation of extraneous echoes not attributable to reflections from the surface of the liquid in the channel.

The ultrasonic level detector is also provided with an adjustable trigger level of amplitude which an echo signal must achieve for registration, a latching memory to hold the value of the last detected process level until a new level is detected, temperature compensation to allow for changes in the velocity of sound in the air above the channel with changes in air temperature, and an output meter which reads in percentages of the total span.

Futher features and the embodimentation and implementation of the invention are explained in conjunction with the drawings.

DESCRIPTION OF THE EMBODIMENT

Figure 1:
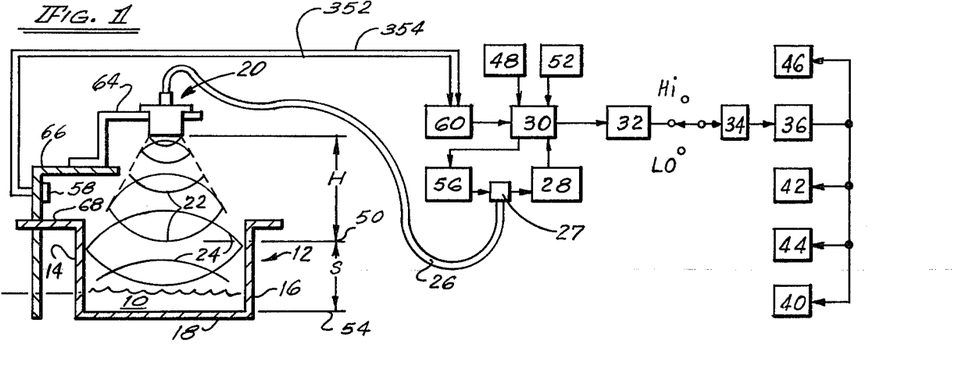
FIG. 1 is a block diagram illustrating the ultrasonic liquid level measurement device of the invention.

FIG. 1 illustrates an ultrasonic level detector for measuring the depth of a flowing liquid 10 in a channel 12. The location of the ultrasonic level detector may be at a flume or at a weir, but in any case the channel 12 includes laterally confining walls 14 and 16 and a transverse floor 18 extending therebetween. The ultrasonic level detection system of the invention employs an ultrasonic transducer, indicated at 20 mounted above the channel 12 for transmitting ultrasonic signals, indicated at 22, toward the trough-shaped channel 12. The ultrasonic transducer 20 also receives reflected ultrasonic signals, or echo signals, indicated at 24, from the channel 12. The reflected echo signals, once sensed by the transducer 20, are passed through an elongated flexible conductive cable 26 and through a junction 27, to receiving station 28 of the device. In the receiving section 28, echo signals are used to clock timing pulses which are generated in a timing control section 30 into an echo signal register.

Timing pulses are counted in the receiving section 28 and tabulated in the echo signal register to record the lapse of time between transmission of an ultrasonic burst and return of the resulting echo signal from the surface of the liquid 10. This time interval is inversely related to the depth of liquid 10 in the channel 12, since a shallow liquid level will increase the time lapse between ultrasonic transmission and echo reception.

The tabulated count is directed from the timing control section 30 to a function module 32. From the function module 32, and in the normal operating mode, amplified signals are directed through a digital to analog converter 34, to a current generator 36 and then to a meter 40 which expresses the occurrence of the echo signals as an indication of liquid level as a percentage of the overall span S of the channel 12. In addition to the meter 40, an upper limit alarm 42 and a lower limit alarm 44 are provided to generate warning signals should the liquid level deviate from between prescribed limits. Also, the current generator 36 directs its output to an integrator or totalizer 46 which calculates the volume of liquid flowing in the channel 12 over a period of time.

The invention includes an adjustable discriminator which includes fine adjustments located in the timing control section 30 and coarse adjustments. The adjustable discriminator includes a 100% or maximum level adjustment mechanism, indicated at 48. The adjustment mechanism 48 is used to calibrate the electronic components of the system to produce an output that conforms to the height of the transducer 20 above a predetermined maximum level of liquid flow, indicated by the demarcation 50. The height of the downwardly directed transmitting face of the transducer 20 above the 100% demarcation 50 is indicated by the distance H.

Similarly, the discriminator of the invention employs a span adjustment section 52 connected to the timing control section 30. The fine and coarse adjustments of the span adjustment mechanism 52 are used to bring the value of the minimum liquid level signal into conformity with the span or depth of the channel from the demarcation 50 to the upper face of the floor 18, indicated by the level 54 in FIG. 1.

This depth is denoted as S. The transducer oscillator for generating ultrasonic signals is located within a transducer driving section 56 to generate signal bursts which are transmitted to the ultrasonic transducer 20 and directed toward the channel 18. A thermister network 58 is located proximate to the path of travel of the ultrasonic waves 22 and echoes 24 and is connected to a temperature control section 60 of the invention, which in turn is connected to the timing control section 30.

The ultrasonic transducer 20 is constructed of opposing electrodes firmly bonded to either face of a ceramic material, preferably barium titanate. The transducer 20 is firmly restrained in a downwardly facing disposition within a vertically aligned aperture in a "Z"-shaped mounting frame 64, which overhangs the channel 12 laterally from the left as depicted in FIG. 1. The mounting frame 64 in turn, is firmly connected to a supporting standard 66 of inverted L-shaped cross-section. The supporting frame 66 is fastened to the channel 12 by attachment onto a flange 68 extending laterally therefrom. It should be understood that the particular mounting arrangement depicted is exemplary only, as numerous other mounting arrangements would be equally as suitable.

Figure 2:
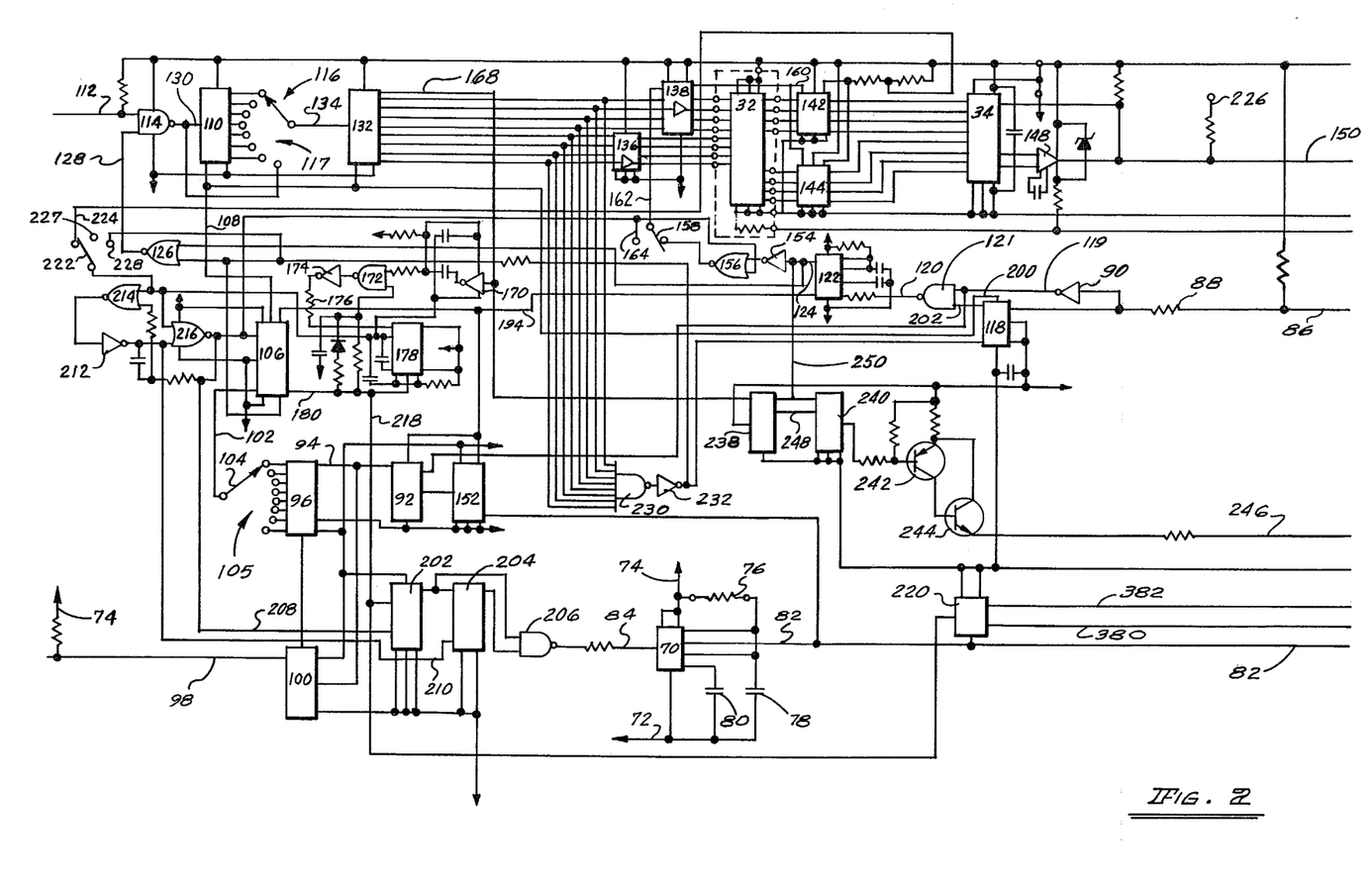
FIG. 2 is a schematic diagram illustrating a portion of the electronic circuitry of the invention.

The ultrasonic pulse bursts transmitted by the ultrasonic transducer 20 and the echo pulses received by the ultrasonic transducer are directed through the transducer driving section 56 and the receiving section 28, portions of which are encompassed within the circuitry of FIG. 2. The circuitry of FIG. 2 also includes the coarse adjustments for the maximum and minimum level calibration circuits 48 and 52 of FIG. 1. With reference to FIG. 2, a one-shot timer 70 is provided and receives a 9.0 volt power supply between 74 and 72. A one megohm resistor 76 is coupled to a 1,000 picofarad capacitor 78. These determine the frequency and pulse width of the output from the one-shot timer 70. Preferably, the width of the pulses appearing on output line 82 is approximately 500 microseconds and the pulse frequency is approximately 0.1 $H_z$. The pulse appears on output line 82 only when the trigger input 84 to the one-shot timer 70 is actuated. The pulse on the output line 82 is directed to the transducer oscillator circuit depicted in FIG. 4, which is described in detail hereinafter.

Figure 4:
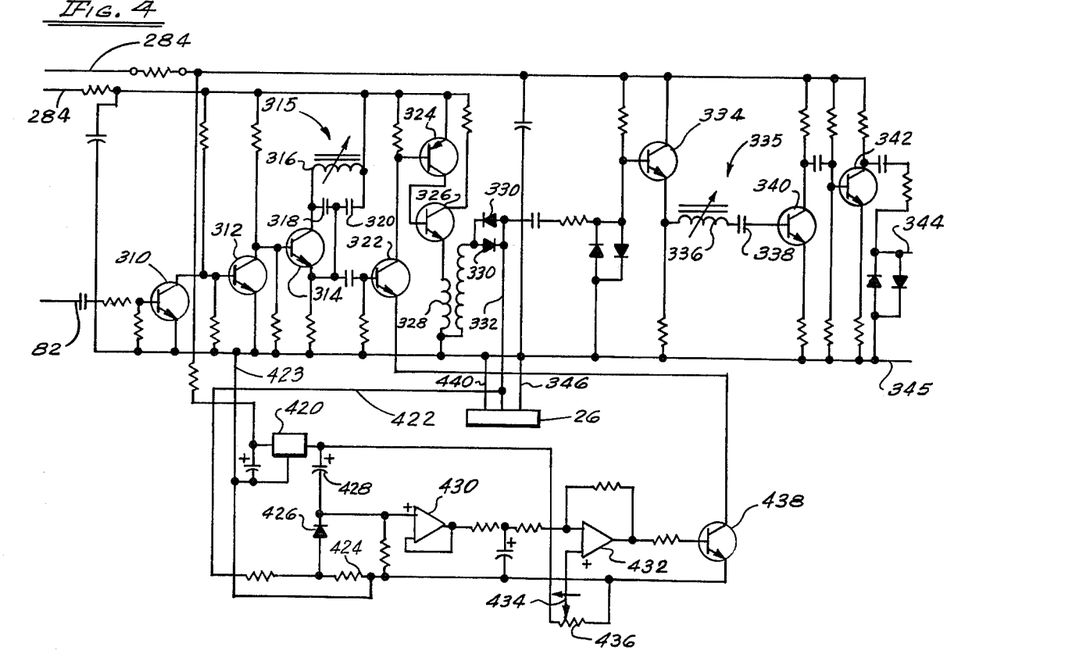
FIG. 4 is a schematic diagram of the ultrasonic oscillator and band pass filter.
Figure 6:
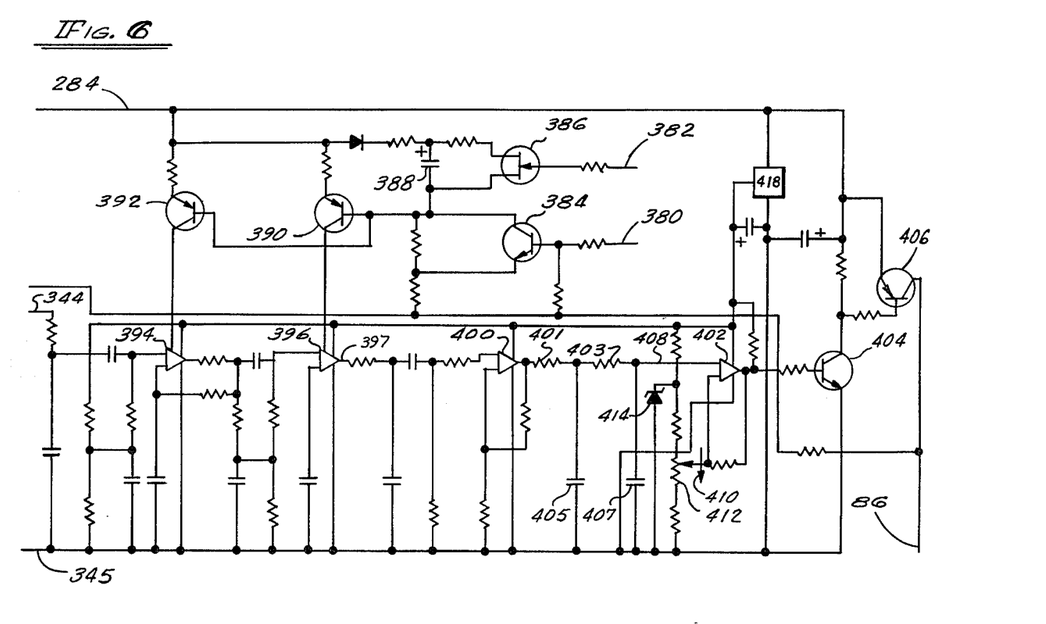
FIG. 6 is a schematic diagram of the amplification circuit of the receiver of the invention.

In FIG. 2, signals produced by the oscillator circuit in FIG. 4 incident to the generation of ultrasonic pulse bursts, as well as reflected ultrasonic pulses, or echo pulses from the transducer 20, are received on line 86 after passing through the band pass filter FIG. 4, and the time variable gain amplifier FIG. 6. The echo pulses are gated through 10K resistor 88 and through an inverting amplifier 90. The output line 119 of the inverting amplifier 90 gates a flip/flop circuit 92. Gating of the flip/flop 92 removes the $\overline{Q}$ output on line 94 which otherwise serves as a reset input to a counter 96. Removal of the reset input from line 94 allows the counter 96 to begin counting in response to counts transmitted on line 98 to counter 100. Counter 100 overflows into counter 96. The input to counter 100 of line 98 is a timing pulse or clock input and together the counters 96 and 100 develop a count corresponding to the distance H in FIG. 1. This distance represents the 100% or maximum liquid level, indicated by the demarcation 50 in FIG. 1.

This threshold count, which counters 96 and 100 must achieve in order to provide the maximum liquid level signal on line 102, is governed by the position of the wiper switch of a 100% adjustment rotary dial 104, which can be adjusted to ride in contact with any one of the terminals of binary ascending output lines from counter 96 indicated generally at 105. The wiper switch 104 thereby forms a coarse adjustment which serves as part of the 100% adjustement mechanism 48 in FIG. 1 and which is used to calibrate the occurrence of the maximum liquid level signal on line 102 with variations in the height H, which may result from vertical repositioning of the transducer 20 relative to the reference demarcation 50.

As the counters 96 and 100 count the clock signals on line 98, they are in fact measuring the time that it takes for an ultrasonic pulse 22 to travel to the maximum level, indicated by the demarcation 50 in FIG. 1, and to return as an echo or reflected pulse 24. This time required to traverse the distance H and return is the minimum signal transit and reflection time. Prior to the appearance of the signal on line 102 following removal of the reset signal on line 94 incident to generation of an ultrasonic pulse burst, any echo signal received on line 86 will be ignored as a false echo since valid echoes 24 indicative of the liquid level in the channel 12 could not possibly occur prior to the elapse of the minimum transit and reflection time required to traverse the distance H and return.

Once a signal appears on line 102 indicating elapse of the minimum signal transit and return time, a J-K flip/flop 106 is pulsed, and the Q output line 108 therefrom goes low. Line 108 is connected to an enabling input of a counter 110 which then begins counting span clock pulses directed to it on line 112 through NAND gate 114. The counter 110 then counts timing pulses beginning at the maximum level, or 100% level corresponding to the demarcation 50 and to the minimum ultrasonic signal transit and reflection time. Counting continues until detection of an echo signal or until the maximum signal transit and reflection time has elapsed. This maximum interval corresponds to the interval which is required for ultrasonic waves 22 to proceed from the maximum of 100% level at demarcation 50 FIG. 1 to the upper surface of the floor 18 of the channel 12 and return to the demarcation 50. Since the depth of channels with which the ultrasonic level sensor of the invention is employed may vary, the span adjustment rotary dial 116 is provided as a coarse adjustment to selectively contact the cascaded binary output lines of the counter 110 indicated collectively at 117. The dial thereby forms a divide circuit to divide the output of counter 110 by a selected power of 2.

In normal operation of the ultrasonic level detector, some time between the time that the counter 110 is enabled by the enabling input on line 108, and the time that the line 168 is made high, an echo pulse will appear on line 86, applying a low signal to inverting amplifier 90. At this time flip/flop 118 is still in its reset condition ($\bar{Q}$ output 202 is high). The signal on line 119 represents the pulse on line 86 inverted by the inverting amplifier 90. The high inputs to NAND gate 121 produce a low output on line 120 to another timing circuit 122. The timing circuit 122 is another one-shot multivibrator circuit which produces an output pulse on line 124 which, in turn, is transmitted to a NOR gate 126. The output line 128 from NOR gate 126 changes in polarity when the one-shot signal appears on line 124, thereby closing the gate 114. This prevents any further timing pulses on line 112 from reaching the timer 110 at the clock pulse input 130 thereto. Thus, when an echo signal is received on line 86, the counter 110 is stopped until the one-shot timing interval of the timer 122 has elapsed. The counter 110 serves as a dividing counter and includes an output directed to a span counter 132. Therefore, when counter 110 is stopped, output pulses therefrom no longer appear at input 134 to counter 132. This freezes the count in counter 132 to a count value indicative of the transit and reflection time to the surface of the liquid 10 from the demarcation 50 within the span S, as depicted in FIG. 1.

The transformation of an echo signal to a timing pulse count in counter 132, as a function of the time of occurrence within the span S in FIG. 1 is thereby achieved. The trailing edge of the echo pulse at line 86 will trigger the clock pulse input of flip/flop 118, causing the $\bar{Q}$ output 202 to go low forcing the output 120 of gate 121 to a high state. Therefore, no subsequent echo pulses will cause a count from counter 132 to be latched in the Hex-D flip/flops 142 and 144. As depicted in FIG. 2, the output lines of counter 132 are connected to voltage buffers 136 and 138 which merely shift voltage levels of the count line inputs from span counter 132. The outputs of the voltage buffers 136 and 138 are directed to the inputs of the functional module 32 of FIG. 1 and FIG. 2 which may be a programmable ROM. It should be understood that the programmable ROM 32 serves a useful function only where it is desirable to non-linearly alter the amplification of the occurrence of the echo signal. For example, in a Parchall flume it is desirable to derive a function of the echo signal percentage of the span S as a function to the three halves power in order to calculate a volume of flow through the channel. Other types of nonlinear amplification as a function of the time of occurrence may be desirable in connection with other types of channels. By employing a programmable ROM, the particular amplification characteristics can be determined by the user and dictated to the system by programming the ROM 32.

From the ROM 32, the timing signal indications of the surface level of the liquid 10 are directed to a set of Hex-D flip/flops 142 and 144. These flip/flops serve as an echo signal register or latch system. The outputs of the Hex-D flip/flops 142 and 144 are directed to a digital to analog converter 34. The analog outputs of the digital to analog converter are connected to an operational amplifier 148. The output line 150 carries the echo (analog voltage signal) signal to the current generator transducer 36 in FIG. 1, where a minimum current signal of approximately 4 milliamperes or a maximum current of approximately 20 milliamps will be produced. The 4–20 milliamp range represents the range between the maximum and minimum liquid levels in the channel 12, indicated by the span S in FIG. 1. The current source transducer 36 is illustrated in detail in FIG. 5 and will be described in detail hereinafter.

Before the flip/flop 92 in FIG. 2 will release the reset line 94 to the 100% or height counter 96, it must first be enabled by the Q output of the flip/flop 152. Flip/flop 152, in turn is set by the output of the one-shot timer 70 on line 82. The Q output of the flip/flop 152 goes high upon the appearance of an output pulse on line 82, and thereby enables the D-input of the flip/flop 92. This conditions the flip/flop 92 to release the reset on 94 when it receives a pulse on line 119 as a clock pulse input as a result of a send pulse that appears on line 86.

Once an echo signal is received on line 86, and the one-shot timer 122 is fired, a latching signal is propogated through an inverter 154, through a NOR gate 156, through a switch 158, to the spare lead of the voltage buffer 138 on line 162. At the output 160 of voltage buffer 138, a signal is produced in response to the input at 162 to the clock pulse inputs of the Hex-D flip/flops 142 and 144 to latch the contents of the counter 132 therein. The switch 158 is a dial, toggle or rocket switch which normally resides in contact with the output of the NOR gate 156, but which may be moved to an alternative contact lead 164 for test purposes.

Following expiration of the output pulse from the one-shot timer 122 on line 124, the clock pulse line 160 to the Hex-D flip/flops 142 and 144 will be released, and the output of NOR gate 126 will rise, to again allow timing pulses on line 112 to pass through the NAND gate 114 to the counter 110 on clock pulse line 130. The counter 132 is thereafter allowed to accumulate clock pulses on line 134 until it overflows with an output on line 168. The overflow signal acts through an inverting amplifier circuit 170, through a NAND gate 172, and through another inverting amplifier 174. The output of amplifier 174 acts through a resistor 176 and starts another one-shot timer 178. The output of the one-shot timer 178 appears on lead 180 and is applied to the J-input of flip/flop 106. When the J-input lead 180 is made high by the one-shot multivibrator 178, the Q output of flip/flop 106 is driven high thus removing the enabling signal from line 108. By removing this signal, the reset lead 200 to flip/flop 118 is no longer held low.

The $\bar{Q}$ output 194 of flip/flop 106 is used to reset the flip/flops 92 and 152 so that at commencement of the next counting cycle, they must be conditioned by a send pulse on line 86 before the 100% counter 96 will begin its tabulation. The counters 96 and 100 are reset by the output of flip/flop 92 on line 94.

Another feature of the system involves the protection of the transducer from excessively rapid repetition rates. A delay circuit is connected to the ultrasonic transducer 20 for establishing a minimum delay between the transmission of successive bursts of ultrasonic signals toward the channel 12. This prevents the transducer from being damaged by exceptionally high repetition rates, which might occur if an object were located should the liquid level deviate from between prescribed limits. Also, the current generator 36 directs its output to an integrator or totalizer 46 which calculates the volume of liquid flowing in the channel 12 over a period of time.

The invention includes an adjustable discriminator which includes fine adjustments located in the timing control section 30 and coarse adjustments. The adjustable discriminator includes a 100% or maximum level adjustment mechanism, indicated at 48. The adjustment mechanism 48 is used to calibrate the electronic components of the system to produce an output that conforms to the height of the transducer 20 above a predetermined maximum level of liquid flow, indicated by the demarcation 50. The height of the downwardly directed transmitting face of the transducer 20 above the 100% demarcation 50 is indicated by the distance H.

Similarly, the discriminator of the invention employs a span adjustment section 52 connected to the timing control section 30. The fine and coarse adjustments of the span adjustment mechanism 52 are used to bring the value of the minimum liquid level signal into conformity with the span or depth of the channel from the demarcation 50 to the upper face of the floor 18, indicated by the level 54 in FIG. 1.

This depth is denoted as S. The transducer oscillator for generating ultrasonic signals is located within a transducer driving section 56 to generate signal bursts which are transmitted to the ultrasonic transducer 20 and directed toward the channel 18. A thermister network 58 is located proximate to the path of travel of the ultrasonic waves 22 and echoes 24 and is connected to a temperature control section 60 of the invention, which in turn is connected to the timing control section 30.

The ultrasonic transducer 20 is constructed of opposing electrodes firmly bonded to either face of a ceramic material, preferably barium titanate. The transducer 20 is firmly restrained in a downwardly facing disposition within a vertically aligned aperture in a "Z"-shaped mounting frame 64, which overhangs the channel 12 laterally from the left as depicted in FIG. 1. The mounting frame 64 in turn, is firmly connected to a supporting standard 66 of inverted L-shaped cross-section. The supporting frame 66 is fastened to the channel 12 by attachment onto a flange 68 extending laterally therefrom. It should be understood that the particular mounting arrangement depicted is exemplary only, as numerous other mounting arrangements would be equally as suitable.

The ultrasonic pulse bursts transmitted by the ultrasonic transducer 20 and the echo pulses received by the ultrasonic transducer are directed through the transducer driving section 56 and the receiving section 28, portions of which are encompassed within the circuitry of FIG. 2. The circuitry of FIG. 2 also includes the coarse adjustments for the maximum and minimum level calibration circuits 48 and 52 of FIG. 1. With reference to FIG. 2, a one-shot timer 70 is provided and receives a 9.0 volt power supply between 74 and 72. A one megohm resistor 76 is coupled to a 1,000 picofarad capacitor 78. These determine the frequency and pulse width of the output from the one-shot timer 70. Preferably, the width of the pulses appearing on output line 82 is approximately 500 microseconds and the pulse frequency is approximately 0.1 $H_z$. The pulse appears on output line 82 only when the trigger input 84 to the one-shot timer 70 is actuated. The pulse on the output line 82 is directed to the transducer oscillator circuit depicted in FIG. 4, which is described in detail hereinafter.

In FIG. 2, signals produced by the oscillator circuit in FIG. 4 incident to the generation of ultrasonic pulse bursts, as well as reflected ultrasonic pulses, or echo pulses from the transducer 20, are received on line 86 after passing through the band pass filter FIG. 4, and the time variable gain amplifier FIG. 6. The echo pulses are gated through 10K resistor 88 and through an inverting amplifier 90. The output line 119 of the inverting amplifier 90 gates a flip/flop circuit 92. Gating of the flip/flop 92 removes the $\overline{Q}$ output on line 94 which otherwise serves as a reset input to a counter 96. Removal of the reset input from line 94 allows the counter 96 to begin counting in response to counts transmitted on line 98 to counter 100. Counter 100 overflows into counter 96. The input to counter 100 of line 98 is a timing pulse or clock input and together the counters 96 and 100 develop a count corresponding to the distance H in FIG. 1. This distance represents the 100% or maximum liquid level, indicated by the demarcation 50 in FIG. 1.

This threshold count, which counters 96 and 100 must achieve in order to provide the maximum liquid level signal on line 102, is governed by the position of the wiper switch of a 100% adjustment rotary dial 104, which can be adjusted to ride in contact with any one of the terminals of binary ascending output lines from counter 96 indicated generally at 105. The wiper switch 104 thereby forms a coarse adjustment which serves as part of the 100% adjustement mechanism 48 in FIG. 1 and which is used to calibrate the occurrence of the maximum liquid level signal on line 102 with variations in the height H, which may result from vertical repositioning of the transducer 20 relative to the reference demarcation 50.

As the counters 96 and 100 count the clock signals on line 98, they are in fact measuring the time that it takes for an ultrasonic pulse 22 to travel to the maximum level, indicated by the demarcation 50 in FIG. 1, and to return as an echo or reflected pulse 24. This time required to traverse the distance H and return is the minimum signal transit and reflection time. Prior to the appearance of the signal on line 102 following removal of the reset signal on line 94 incident to generation of an ultrasonic pulse burst, any echo signal received on line 86 will be ignored as a false echo since valid echoes 24 indicative of the liquid level in the channel 12 could not possibly occur prior to the elapse of the minimum transit and reflection time required to traverse the distance H and return.

Once a signal appears on line 102 indicating elapse of the minimum signal transit and return time, a J-K flip/flop 106 is pulsed, and the Q output line 108 therefrom goes low. Line 108 is connected to an enabling input of a counter 110 which then begins counting span clock pulses directed to it on line 112 through NAND gate 114. The counter 110 then counts timing pulses beginning at the maximum level, or 100% level corresponding to the demarcation 50 and to the minimum ultrasonic signal transit and reflection time. Counting continues until detection of an echo signal or until the maximum signal transit and reflection time has elapsed. This maximum interval corresponds to the interval which is required for ultrasonic waves 22 to proceed from the maximum of 100% level at demarcation 50 FIG. 1 to the upper surface of the floor 18 of the channel 12 and return to the demarcation 50. Since the depth of channels with which the ultrasonic level sensor of the invention is employed may vary, the span adjustment rotary dial 116 is provided as a coarse adjustment to selectively contact the cascaded binary output lines of the counter 110 indicated collectively at 117. The dial thereby forms a divide circuit to divide the output of counter 110 by a selected power of 2.

In normal operation of the ultrasonic level detector, some time between the time that the counter 110 is enabled by the enabling input on line 108, and the time that the line 168 is made high, an echo pulse will appear on line 86, applying a low signal to inverting amplifier 90. At this time flip/flop 118 is still in its reset condition ($\overline{Q}$ output 202 is high). The signal on line 119 represents the pulse on line 86 inverted by the inverting amplifier 90. The high inputs to NAND gate 121 produce a low output on line 120 to another timing circuit 122. The timing circuit 122 is another one-shot multivibrator circuit which produces an output pulse on line 124 which, in turn, is transmitted to a NOR gate 126. The output line 128 from NOR gate 126 changes in polarity when the one-shot signal appears on line 124, thereby closing the gate 114. This prevents any further timing pulses on line 112 from reaching the timer 110 at the clock pulse input 130 thereto. Thus, when an echo signal is received on line 86, the counter 110 is stopped until the one-shot timing interval of the timer 122 has elapsed. The counter 110 serves as a dividing counter and includes an output directed to a span counter 132. Therefore, when counter 110 is stopped, output pulses therefrom no longer appear at input 134 to counter 132. This freezes the count in counter 132 to a count value indicative of the transit and reflection time to the surface of the liquid 10 from the demarcation 50 within the span S, as depicted in FIG. 1.

The transformation of an echo signal to a timing pulse count in counter 132, as a function of the time of occurrence within the span S in FIG. 1 is thereby achieved. The trailing edge of the echo pulse at line 86 will trigger the clock pulse input of flip/flop 118, causing the $\overline{Q}$ output 202 to go low forcing the output 120 of gate 121 to a high state. Therefore, no subsequent echo pulses will cause a count from counter 132 to be latched in the Hex-D flip/flops 142 and 144. As depicted in FIG. 2, the output lines of counter 132 are connected to voltage buffers 136 and 138 which merely shift voltage levels of the count line inputs from span counter 132. The outputs of the voltage buffers 136 and 138 are directed to the inputs of the functional module 32 of FIG. 1 and FIG. 2 which may be a programmable ROM. It should be understood that the programmable ROM 32 serves a useful function only where it is desirable to non-linearly alter the amplification of the occurrence of the echo signal. For example, in a Parchall flume it is desirable to derive a function of the echo signal percentage of the span S as a function to the three halves power in order to calculate a volume of flow through the channel. Other types of nonlinear amplification as a function of the time of occurrence may be desirable in connection with other types of channels. By employing a programmable ROM, the particular amplification characteristics can be determined by the user and dictated to the system by programming the ROM 32.

From the ROM 32, the timing signal indications of the surface level of the liquid 10 are directed to a set of Hex-D flip/flops 142 and 144. These flip/flops serve as an echo signal register or latch system. The outputs of the Hex-D flip/flops 142 and 144 are directed to a digital to analog converter 34. The analog outputs of the digital to analog converter are connected to an operational amplifier 148. The output line 150 carries the echo (analog voltage signal) signal to the current generator transducer 36 in FIG. 1, where a minimum current signal of approximately 4 milliamperes or a maximum current of approximately 20 milliamps will be produced. The 4-20 milliamp range represents the range between the maximum and minimum liquid levels in the channel 12, indicated by the span S in FIG. 1. The current source transducer 36 is illustrated in detail in FIG. 5 and will be described in detail hereinafter.

Before the flip/flop 92 in FIG. 2 will release the reset line 94 to the 100% or height counter 96, it must first be enabled by the Q output of the flip/flop 152. Flip/flop 152, in turn is set by the output of the one-shot timer 70 on line 82. The Q output of the flip/flop 152 goes high upon the appearance of an output pulse on line 82, and thereby enables the D-input of the flip/flop 92. This conditions the flip/flop 92 to release the reset on 94 when it receives a pulse on line 119 as a clock pulse input as a result of a send pulse that appears on line 86.

Once an echo signal is received on line 86, and the one-shot timer 122 is fired, a latching signal is propogated through an inverter 154, through a NOR gate 156, through a switch 158, to the spare lead of the voltage buffer 138 on line 162. At the output 160 of voltage buffer 138, a signal is produced in response to the input at 162 to the clock pulse inputs of the Hex-D flip/flops 142 and 144 to latch the contents of the counter 132 therein. The switch 158 is a dial, toggle or rocket switch which normally resides in contact with the output of the NOR gate 156, but which may be moved to an alternative contact lead 164 for test purposes.

Following expiration of the output pulse from the one-shot timer 122 on line 124, the clock pulse line 160 to the Hex-D flip/flops 142 and 144 will be released, and the output of NOR gate 126 will rise, to again allow timing pulses on line 112 to pass through the NAND gate 114 to the counter 110 on clock pulse line 130. The counter 132 is thereafter allowed to accumulate clock pulses on line 134 until it overflows with an output on line 168. The overflow signal acts through an inverting amplifier circuit 170, through a NAND gate 172, and through another inverting amplifier 174. The output of amplifier 174 acts through a resistor 176 and starts another one-shot timer 178. The output of the one-shot timer 178 appears on lead 180 and is applied to the J-input of flip/flop 106. When the J-input lead 180 is made high by the one-shot multivibrator 178, the Q output of flip/flop 106 is driven high thus removing the enabling signal from line 108. By removing this signal, the reset lead 200 to flip/flop 118 is no longer held low.

The $\overline{Q}$ output 194 of flip/flop 106 is used to reset the flip/flops 92 and 152 so that at commencement of the next counting cycle, they must be conditioned by a send pulse on line 86 before the 100% counter 96 will begin its tabulation. The counters 96 and 100 are reset by the output of flip/flop 92 on line 94.

Another feature of the system involves the protection of the transducer from excessively rapid repetition rates. A delay circuit is connected to the ultrasonic transducer 20 for establishing a minimum delay between the transmission of successive bursts of ultrasonic signals toward the channel 12. This prevents the transducer from being damaged by exceptionally high repetition rates, which might occur if an object were located too close to the ultrasonic transmitting face of the trasducer 20.

As previously noted, each ultrasonic burst is initiated by an output from the one-shot timer 70. To be actuated, the timer 70 must receive an input on line 84. This input is derived from flip/flops 202 and 204, the combined outputs of which are directed through a NAND gate 206 to initiate the 500 microsecond output pulse from the timer 70. The inputs to the NAND gate 206 are from the $\overline{Q}$ output leads of the flip/flops 202 and 204. These flip/flops, in turn, are actuated by pulse inputs on lines 208, 210, and 180. The input on line 208 and 210 is from a high frequency clock formed by the amplifier 212 and a pair of NOR gates 214 and 216. To prevent the repetition rate of pulses from the one-shot timer 70 from proceeding too rapidly, the one-shot timer 178 responds to the amplifier 174 and provides a 100 millisecond output pulse on line 180. Since the NAND gate 206 responds to negative signals, the appearance of the 100 millisecond signal on line 180 at the D-input to the flip/flop 202 closes the NAND gate 206 for the duration of that interval. The output on line 180 also resets the flip/flop 202.

To facilitate certain calibration and testing functions, a pair of switches 158 and 222 are provided. When the switch 158 is in the test position, 164, the switch 222 can be turned to the high position line 224. When in this position, the switch 222 causes the Hex-D flip/flops 142 and 144 to be reset. This produces an output from these switches which represents the lowest possible count level which in turn corresponds to the maximum liquid level of the span S in FIG. 1. Calibration to ensure that the highest level of current (approximately 20 milliamps) is produced is then possible by observing the output on line 150 to the current source at the test point 226. When switch 222 is in the low position to contact 227, the lowest level corresponding to approximately 4 milliamps will appear on line 150 because of the condition of line 128 to NAND gate 114 resulting from the inputs to NAND gate 230 when counter 132 is full.

Another test procedure involves rotating the switch 158 form the normal position indicated in FIG. 2 to the test position lead 164. Movement of the switch 158 to this position while the switch 222 is in contact with the normal position lead 228 turns on the flip/flops 142 and 144 constantly. Thus, the count accumulating in counter 132 is not latched, but is gated directly through to the digital to analog converter 34. Monitoring of the test point 226 then allows an observer to watch the signal on line 150 to ensure that it has a proper ramping curve and to observe the time function of gain applied to the current generator in FIG. 5 by the signal on line 150. In normal operation, the ultrasonic level flow detector has a latching memory. That is, the latching flip/flops 142 and 144 hold the value of the last detected liquid level until a new level is detected. During the cycling of the system through the counting sequences, the Hex-D flip/flops 142 and 144 retain this last value until updated to a new value.

A guarding circuit is also provided to ensure that no more echo signals are allowed to pass through the system from line 86 once a valid echo signal has been received or once the span counter 132 is full. This limits echo signal registration to a single echo signal occurring between the minimum and maximum signal transit and reflection times. To achieve this, all of the output leads from the counter 132 are combined together in a NAND gate 230, the output of which is inverted by the inverting amplifier 232. The output of the amplifier 232 sets the flip/flop 118 to drive the $\overline{Q}$ output 202 therefrom low. This inhibits latching of the flip/flops 142 and 144 at the occurrence of the maximum signal transit and reflection time. Similarly, once an echo pulse is received on line 86 during the interval between the minimum and maximum signal transit and reflection times, the flip/flop 118 is pulsed to drive the $\overline{Q}$ output 202 therefrom low and to prevent any further echo signals from being registered until the flip/flop 106 resets the flip/flop 118 by a signal on line 200 at the termination of the cycle.

A circuit is also provided to signal the occurrence of a lost echo. That is, if the transducer is producing signals 22, but does not receive reflected signals 24, indicated in FIG. 1, it is advisable to indicate an error condition. This is achieved using a counter 238 coupled to a flip/flop 240, the Q output of which, in turn, is directed to the base of a transistor 242 which, in turn, drives a transistor 244. The emitter output signal on line 246 from transistor 244 indicates that a predetermined successive number of transmitted ultrasonic signals 22 have failed to produce an acceptable echo signal 24. This requisite number is established by the pin connection from counter 238 to line 248, which in turn is connected to the set lead of flip/flop 240. Preferably, a count of seven overflow pulses from the counter 132 on line 168 is required to produce a signal on line 248 from the counter 238 to set the flip/flop 240.

Under normal conditions, when an echo is received in response to each ultrasonic pulse burst transmitted, the output of the one-shot timer 122 on line 124 will serve as a reset signal on line 250, both to the counter 238 and to the flip/flop 240. However, should no echoes appear, the one-shot 122 will fail to fire. The counter 238 will then tabulate signals on line 168 until the flip/flop 240 is set and the transistors 242 and 244 are activated to drive a lost echo signal light, connected to the output line 246. This light is located near the meter 40 in FIG. 1. Such a signal indicates that the channel 12 is, perhaps out of range of the transducer 20, or that there may be some debris in front of the transducer. This latter situation would cause an echo to be received permaturely and hence lost since the echo would occur before the flip/flop 118 is reset and enabled by the signal on line 200.

While it would be possible to trigger the flip/flop 240 directly from the overflow output line 168, echoes, for one reason or another, are occasionally not received during normal operation of the instrument. A wave in the channel or some other temporary erratic condition may result in failure of an echo to be received during a particular cycle. However, after having tabulated the occurrence of a number of successive cycles when echoes do not appear, the error indication from the counter 238 is a fairly reliable signal that the abnormal condition is not transitory.

Figure 5:
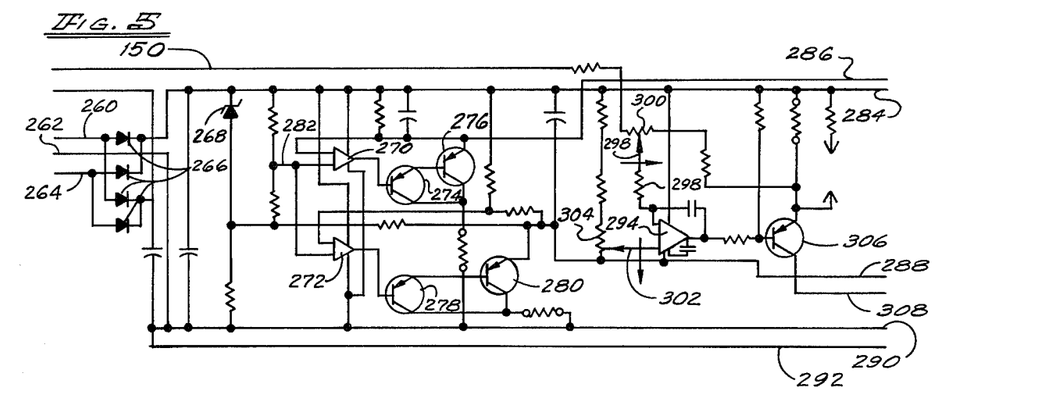
FIG. 5 is a schematic diagram of the system power supply and current generator.

FIG. 5 illustrates in detail the power supply and the current generator 36 for the ultrasonic level flow detector. Inputs from a conventional transformer, typically operated from a 110–130 volt, 60-cycle a.c. supply, are received on lines 260, 262, and 264, indicated in FIG. 5. Line 262 is the neutral, or ground line. The a.c. signals from these transformer outputs are directed through two conventional full wave rectifying network of diodes 266. A zener diode 268 is used to maintain a regulated input to operational amplifiers 270 and 272. A 26.5 volt d.c. supply is produced as an output on line 284. A 21.5 volt supply on line 286 is derived and regulated at five volts less than the output on line 284 from amplifier 270 and a 17.5 volt supply on line 288 is also provided regulated at nine volts less than the output on line 284 from amplifier 272. An unregulated voltage supply is produced on output lines 284, 290 and 292. Lines 290 and 292 are at 0 volts d.c., while line 284 is at 26.5 volts d.c. To derive the output on line 286 feedback from the transistor pair 274 and 276 is provided to amplifier 270. Similarly, to derive the output on line 288, feedback from transistors 278 and 280 is provided to amplifier 272. The outputs of amplifiers 270 and 272 are regulated against the inputs thereto on line 282.

Operational amplifier 294 is used to regulate the current output and forms the principal component of the current generator 36. By employing a regulated current generator, the signal output of the instrument can be calibrated responsive to test readings obtained by manipulation of the switches 158 and 222, as previously described. The output line 150 from the amplifier 148 in FIG. 2 is fed to a gain adjustment circuit which includes a wiper 298 that may be moved along a resistor 300. Similarly, a wiper 302 may be moved along a resistor 304. Movement of the wiper 302 is a null adjustment so that the output on line 308 from transistor 306 will be 20 milliamps at its maximum level. Conversely, when the maximum voltage source is gated through to the current generator 36 on line 150 during testing and calibration, the wiper 298 is adjusted along resistor 300 so that the output on line 308 is 4 milliamps at its lowest level.

The ultrasonic transmission initiating pulse from the timer 70 on line 82 in FIG. 2 is used as an input to the oscillator and band pass section of the device depicted in FIG. 4. The 500 microsecond input pulse from line 82 is amplified through transistors 310, 312, and 314 to the input of an oscillator 315 which employs an adjustable inductor 316 and a pair of capacitors 318 and 320. The oscillator 315 is turned on by the current at the collector of transistor 314 to generate a signal of approximately 40 kiloHertz. The adjustable inductor 316 is manually adjustable so that the frequency of the ultrasonic signals generated can be varied to match the resonant frequency of the ultrasonic transducer 20. The adjustable inductor 316 thereby serves as a resonance matching device. The 40 kiloHertz signal is directed through transistor 322. The emitter of transistor 322 is connected to an automatic gain correction circuit which compensates automatically for variations in the length of cable 26 to the transducer 20, indicated in FIG. 1.

The ultrasonic level flow detector of the invention has a significantly improved level of flexibility as contrasted with prior systems in that the user is free to select the length of cable 26 which is to be used with the system. Prior systems have required factory adjustment specifying the exact cable length to be used with each ultrasonic level detection system. The automatic level control of the present invention, on the other hand, allows the user to change cable lengths at will.

In the automatic level control circuit, the input signal to the transducer on line 332 to produce the ultrasonic frequency bursts is sensed at line 422. The signal is passed through a resistor 424 to a rectifying diode 426. Since the signal appearing on line 332 is an ultrasonic current signal, the diode 426 rectifies this signal and charges the capacitor 428. A voltage regulator 420 produces a regulated 12 volt output to the other side of capacitor 428. According to the level to which the capacitor 428 is charged, an input controlled voltage is provided to one input of the buffering amplifier 430.

The output of the amplifier 430 is provided to one input of an inverting operational amplifier 432. The other input to amplifier 432 is adjusted during the initial construction of the instrument by moving a wiper 434 along a drive adjusting resistor 436. The amplifier 432 compares the input from amplifier 430 to the input from wiper 434. A transistor 438 is driven by the differential comparison signal at the output of the amplifier 432. Transistor 438 receives the emitter output of transistor 322, and in effect, determines how hard transistor 322 is driving the system. This causes the transistor 438 to increase the output applied to line 332 to the transducer 20 to thereby compensate for any increase in cable length. Conversely, a reduction in cable length will produce a stronger signal on line 422, thus causing transistor 438 to produce a reduced voltage on line 422. Accordingly, virtually any length of cable 26 within the allowable range of adjustment of the wiper 434 on resistor 436, may be employed at any time. The amplitude of drive, as sensed from line 422, is input to the automatic level control circuit, where it is compared with a reference level to turn on transistor 438, more, or less as appropriate.

The collector of transistor 322 drives signal amplifying transistors 324 and 326 to one side of a variable transformer 328. The output from the other side of transformer 328 is directed through clamping diodes 330 to a transducer transmitting line 332 which is the actuating input signal to cable 26. The diodes 330 clamp the output of the oscillator 315 to prevent ultrasonic transmission signals from interfering with echo signals received by transducer 20. The signal from the variable transformer 328 is also directed to the receiving section 28, in FIG. 1. The receiving section 28, in addition to circuitry described in conjunction with FIG. 2, also includes a transistor 334, and a band pass filter 335. The band pass filter 335 ensures that only signals of proper frequencies are passed through to control the digital processing circuit elements of FIG. 2. The output capacitor 338 is directed through preamplifying transistors 340 and 342 to produce a signal on line 344. This signal is directed through a time amplifying system depicted in FIG. 6.

Both the transmitted ultrasonic signals and the echo signals are amplified and directed through the band pass filter 335 from line 332. The echo signals are, of course, much weaker than the transmitting signals on line 332. The signals on line 332, whether first sensed in the transducer 20 as echo signals or passed through the transducer 20 are directed through the band pass filter 335.

Figure 3:
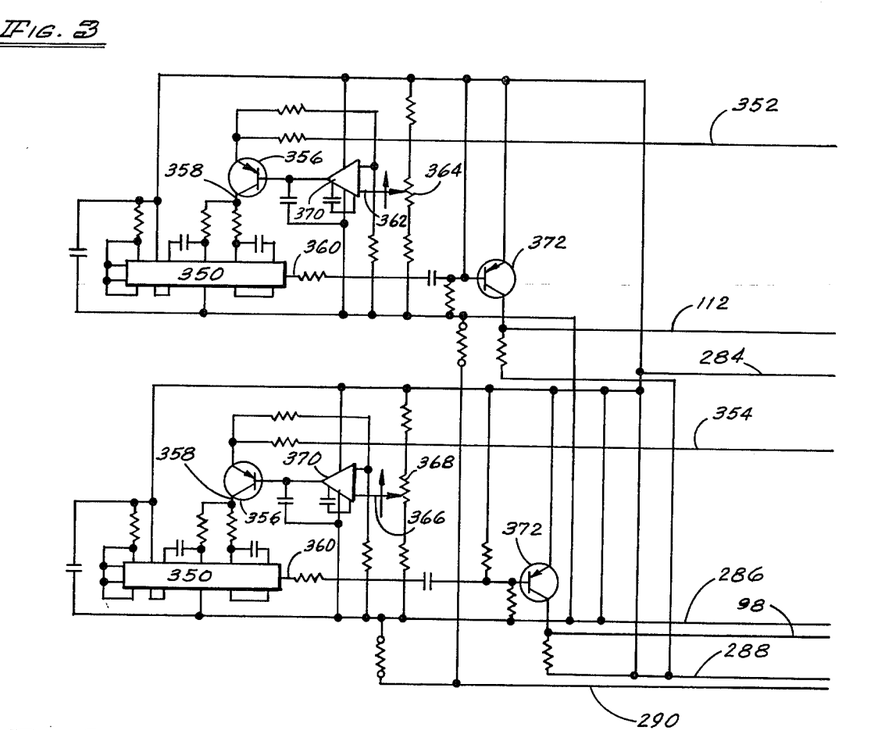
FIG. 3 is a schematic diagram of the system timing mechanism.

FIG. 3 illustrates the timing control section 30. The timing control section 30 employs a pair of identical clock circuits each having a variable clock oscillator 350. Also, the thermister networks, are employed, one for each clock. The thermister circuit 58 of FIG. 1 has a temperature sensitive element located proximate to the ambient air, above the channel 12. Temperature signal input lines 352 and 354 lead to the timing control section 30. Variations in temperature, as sensed by the thermisters 58, reflect a difference in the resistance applied between the voltage appearing on line 284, on the one hand, and the input leads 352 and 354 on the other. Variations in this resistance directly affect the amount of current appearing at the collectors of transistors 356, which together form the temperature control section 60 of FIG. 1. This variation in collector current at the transistors 356 in turn directly affects the value of the bias current applied to the clocks 350 from the collector outputs 358 from the transistors 356. The current appearing on lines 358 directly affects the frequencies of the outputs of the clocks 350 on lines 360.

The other variable inputs to the current generating transistors 356 are provided through adjustment of the span control 362 along resistor 364 and adjustment of the 100% calibration control 366 along the resistor 368. Both the controls 362 and 366 are fine adjustments to control, respectively, calibration for the span S and the height H depicted in FIG. 1. The control 366 is operated as a fine tuning adjustment once the coarse adjustment switch 104 in FIG. 2 has been set. Together the coarse adjustment switch 104 and the fine adjustment control 366 form the 100% adjustment circuit 48 of FIG. 1 and serve as a control for adjusting the digital output of the instrument to accomodate any height H within the instrument range. The operation of the coarse control switch 104 was previously explained in conjunction with FIG. 2.

Similarly, the span control 362, and the coarse adjustment switch 116, depicted in FIG. 2 form the span adjustment circuit 52 in FIG. 1 and control the digital output of the instrument to accomodate any span S within range. Operation of the switch 116 was likewise previously explained in conjunction with FIG. 2.

With the fine tuning adjustment provided by the wipers 362 and 366, the clocks 350 respond to the variation in the current applied on lines 358 resulting from the outputs of amplifiers 370 which are applied to the bases of transistors 356. The clocks 350 thereby produce controlled frequency outputs on lines 360. These outputs are applied to voltage and amplifying buffer transistors 372. The clock 350 associated with the span control 362 thereby provides a clock output on line 112 to the NAND gate 114 in FIG. 2, while the clock 350 associated with the control 366 provides the clock output on line 98 to the counter 100 in FIG. 2.

As previously explained, it is desirable to recover the signal strength of an echo 24 that may be lost with increasing distance from the transducer 20. The lower the level of the liquid 10 in the channel 12, the greater will be the attenuation of echo signals 24 before receipt by the transducer 20. Compensation for this attenuation is achieved with the time amplification circuitry of FIG. 6.

When the ultrasonic signals 22 are initiated by the output of the one-shot timer 70 in FIG. 2, the flip/flop 220 is set by the signal on line 82. This produces opposing outputs on lines 380 and 382. These outputs are received in the time amplification circuitry of FIG. 6 to turn on the transistor 384 and turn off the transistor 386. This causes the ramping capacitor 388 to charge down from the voltage supply level of voltage line 284. As the capacitor 388 charges down, the inputs to the bases of transistors 390 and 392 is increased. This increases the bias current to amplifiers 394 and 396.

The amplifiers 394 and 396 represent the variable gain stages of the amplification circuitry of FIG. 6. Amplifier 394 receives its inputs from lines 344 and 345 from the band pass filter 335 of FIG. 4. The gain of amplifiers of 394 and 396 is nearly linearly proportional to the bias currents received from transistors 392 and 390 respectively. As the current thereto is increased, the gain of each of these variable gain amplification stages is increased. As a consequence, the gain of the output of amplifiers 394 and 396 together is increased as the square of the biasing input thereto. The biasing input, in turn, is proportional to elapsed time while elapsed time is proportional to distance transversed by the signals 22. This effectively compensates for the attenuation of the echo signals 24 in FIG. 1 which are reduced in magnitude proportional to the square of distance from the transducer 20.

The outputs of amplifiers 394 and 396 at 397 provide a ramping signal that increases with the square of elapsed time from the generation of the activating signal to the transducer 20 appearing on line 82 from the one-shot timer 70 in FIG. 2. Amplifiers 400 and 402 form the fixed gain portion of the gain control system. Amplifier 400 is connected to the output of amplifier 396 and to line 345 and produces an output which is rectified then filtered by resistors 401 and 403 and by capacitors 405 and 407. Accordingly, the signal input on line 408 to amplifier 402 is no longer a 40 kiloHertz signal, but rather is merely the envelope of 40 kiloHertz signals.

The amplifier 402 serves as a Schmitt trigger, and includes a threshold adjustment at one input. This adjustment assumes the form of a control 410 connected to move relative to a resistor 412. Movement of the control 410 allows the requisite threshold level which must be achieved for firing of the Schmitt trigger 402, to be altered for a specific system. The threshold established by adjustment of the wiper 410 and the connection of the zener diode 414, varies the voltage level against which the other input to amplifier 402 on line 408 is referenced.

The output of the Schmitt trigger 402 is directed through level shifting and buffering transistors 404 and 406 to produce an output on line 86, which is the same echo signal line that appears as an input in FIG. 2. A 20-volt regulator 418 provides a regulated voltage supply to Schmitt trigger 402 and to the amplifiers 400, and 394 and 396.

Following each counting cycle, the 100 millisecond signal on line 180 in FIG. 2 resets the flip/flop 220 and reverses the polarity of outputs on lines 380 and 382. This causes the transistor 386 in FIG. 6 to conduct and transistor 384 to stop conducting. The ramping capacitor 388 is thereby discharged through the transistor 386 so that it is returned to its common discharge level in preparation for receipt of the next echo signal.

The various indicators and other systems connected to the output of the digital to analog converter 34 in FIG. 1 are conventional units. The integrator 46 depicted in FIG. 1 is a conventional integrator totalizer unit used for providing an indication of mass flow over a period of time. Some suitable integrators 46 for this purpose are manufactured as models 534 and 571 by the Robertshaw Controls Company. Similarly, the duplex alarms 42 and 44 are also standard commercially available alarm units. The alarms 42 and 44 will sound at different predetermined levels. One commercially available unit containing both of the alarms 42 and 44 is manufactured by the Robertshaw Controls Company as the model 554 duplex alarm.

The switch 222 (FIG. 2) is put in position 224 (high) and the null pot 302 (FIG. 5) is adjusted to obtain a current output of approximately 20 milliamps (20.38MA). Then switch 22 is moved to 224 (low) and pot 302 is adjusted to obtain a current output of approximately 4 milliamps (3.62 MA).

The above is a factory type adjustment. It is made to adjust the current generator of the instrument and is independent of application of the device.

For calibration to the process (specific height H and span S) the switch 222 is in position 228 (norm). The process level is raised to the 100% level (or a simulated 100% level. The 100% controls switch 104 and pot 366 of FIG. 2 and which include the coarse adjustement the fine adjustment wiper 366 of FIG. 3, are adjusted to obtain 20.0 milliamps. Then the process level is taken to 0% and span controls 116 (FIG. 2) and 362 (FIG. 3) are adjusted to obtain 4.0 milliamps. The procedure is then repeated to eliminate slight interaction of controls.

It should be considered that various modifications and alterations of the invention will undoubtedly be recognized by those skilled in the art. Accordingly, the scope of the invention should not be considered as limited to the specific embodiment depicted in the drawings, but rather is defined by the claims appended hereto.

What is claimed is:

1. An ultrasonic level flow detector for measuring the depth of a fluid flowing in a channel comprising:
   ultrasonic transducer means mounted above said channel for transmitting ultrasonic signals toward said channel and for receiving reflected ultrasonic signals therefrom;
   receiving means for detecting ultrasonic signals received by said ultrasonic transducer means;
   echo signal registration means coupled to said receiver for registering the occurence of an echo signal;
   indicator means connected to said echo signal registration means for expressing the occurrence of said echo signal as an indication of fluid flow level;
   adjustable discriminator means connected to said echo signal registration means to provide a maximum level signal at a minimum signal transit and reflection time and a minimum level signal at a maximum signal transit and reflection time, and to gate said echo signal registration means to receive an echo signal only during the interval therebetween; and
   time dependent non-linear gain amplification means interposed between said echo signal registration means and said indicator means for non-linearly increasing amplication of said echo signal as an increasing function of elapsed time between occurrence of said maximum level signal and said echo signal.

2. An ultrasonic level flow detector according to claim 1 further characterized in that said adjustable discriminator means includes selector means for manually and adjustably controlling the generation of said maximum level signal.

3. An ultrasonic level flow detector according to claim 1 further characterized in that said adjustable discriminator means includes selector means for manually and adjustably controlling the generation of said minimum level signal.

4. An ultrasonic level flow detector according to claim 1 further comprising counting means connected to said echo signal registration means to count minimum level signals, a reset lead connected to said receiver for resetting said counter each time an echo signal is received by said receiver, and lost echo indicating means connected to said counting means for signifying the absence of receipt of an echo signal by said receiver upon reaching a predetermined count of minimum level signals.

5. An ultrasonic level flow detector according to claim 1 wherein said receiver further includes a frequency band pass filter to limit said echo signals to ultrasonic signals within a prescribed frequency range.

6. An ultrasonic level flow detector according to claim 1 further comprising means for manually adjusting the duration and amplitude of said ultrasonic signals transmitted toward said channel.

7. An ultrasonic level flow detector for measuring the depth of a flowing fluid in a channel comprising:
   ultrasonic transducer means mounted above said channel for transmitting ultrasonic signals toward said channel and for receiving reflected ultrasonic signals therefrom;
   receiving means for detecting ultrasonic signals received by said ultrasonic transducer means;
   echo signal registration means coupled to said receiver for registering the occurrence of an echo signal;
   indicator means connected to said echo signal registration means for expressing the occurrence of said echo signal as an indication of fluid flow level;
   adjustable discriminator means connected to said echo signal registration means to provide a maximum level signal at a minimum signal transit and reflection time and a minimum level signal at a maximum signal transit and reflection time, and to gate said echo registration means to receive an echo signal only during the interval therebetween; and
   a programmable read only memory interposed between said echo signal registration means and said indicator means for increasing amplification of said echo signal as a function of the time of occurrence thereof within the time interval between said minimum and maximum signal transit and reflection times.

8. An ultrasonic level flow detector according to claim 7 wherein said receiver comprises an adjustable threshold level discriminator for establishing a minimum amplitude for echo signals for registration in said echo signal registration means.

9. An ultrasonic level flow detector according to claim 7 further characterized in that said echo signal registration means includes a memory latch for retaining the most recently registered echo signal as an input to said indicator means until updated by a subsequently registered echo signal.

10. An ultrasonic level flow detector according to claim 7 further comprising temperature monitoring means for monitoring the ambient temperature above said flowing fluid and coupled to said adjustable discriminator means for automatically varying said minimum and maximum transit reflection times to vary the occurrence of said maximum and minimum level signals with ambient temperature.

11. An ultrasonic level flow detector for measuring the depth of a flowing fluid in a channel comprising;
   ultrasonic transducer means mounted above said channel for transmitting ultrasonic signals toward said channel and for receiving reflected ultrasonic signals therefrom;
   receiving means for detecting ultrasonic signals received by said ultrasonic transducer means;
   echo signal registration means coupled to said receiver for registering the occurrence of an echo signal;
   indicator means connected to said echo signal registration means for expressing the occurrence of said echo signal as an indication of fluid flow level;

adjustable discriminator means connected to said echo signal registration means to provide a maximum level signal at a minimum signal transit and reflection time and a minimum level signal at a maximum signal transit and reflection time, and to gate said echo signal registration means to receive an echo signal only during the interval therebetween; and resonance matching means for varying the frequency of ultrasonic signals transmitted toward said channel to match the resonant frequency of said ultrasonic transducer means.

12. An ultrasonic level flow detector according to claim 11 further comprising manual adjusting means for said resonance matching means.

13. An ultrasonic level flow detector for measuring the depth of a flowing fluid in a channel comprising
ultrasonic transducer means mounted above said channel for transmitting ultrasonic signals toward said channel and for receiving reflected ultrasonic signals therefrom;
receiving means for detecting ultrasonic signals received by said ultrasonic transducer means;
echo signal registration means coupled to said receiver for registering the occurrence of an echo signal;
indicator means connected to said echo signal registration means for expressing the occurrence of said echo signal as an indication of fluid flow level; and
an ultrasonic driver,
a connecting cable joining said transducer to said receiver and to said ultrasonic driver, and
cable impedance compensation means interposed between said cable and said receiver and said ultrasonic driver to automatically stabilize the strength of ultrasonic signals transmitted and echo signals received irrespective of connecting cable length.

14. An ultrasonic liquid level measurement device for detecting ultrasonic echoes reflected through air from a liquid interface therewith from liquid residing within a solid floored confinement comprising:
an ultrasonic transducer for transmitting ultrasonic signals toward the floor of said confinement;
a receiver responsive to reflected ultrasonic signals to produce an electrical echo signal;
oscillator means connected to said receiver and to said transducer for generating electrical timing signals during a measurement interval;
adjustable discriminator means connected to said oscillator means to count timing signals to generate a maximum liquid level signal and a minimum liquid level signal corresponding respectively to manually adjustable minimum and maximum ultrasonic signal transmission and reflection times and including a manual coarse adjustment to designate counting totals of said timing signals at which said maximum and minimum level signals are generated and a manual fine adjustment to alter the frequency at which said timing signals are generated;
echo signal registration means connected to said discriminator means and to said oscillator means for counting timing signals during the interval between said maximum level signal and said echo signal, and for registering the timing signal count accumulated therebetween as a portion of the interval between said maximum and minimum ultrasonic signal transmission and reflection times; and
indicator means connected to said echo signal registration means to transform said timing signal count accumulated in said echo signal registration means to a perceptable indication of liquid level.

15. An ultrasonic liquid level measurement device according to claim 14 further comprising an alarm system operatively responsive to the accumulated count in said echo signal registration means to generate alarm indications whenever said accumulated count falls beyond acceptable upper and lower limits.

16. An ultrasonic liquid level measurement device according to claim 14 further characterized in that said adjustable discriminator means includes manually operable test controls for suppressing the registration of said echo signals in said echo signal registration means and for selectively registering said maximum level signal and said minimum level signal in said echo signal registration means in place of said echo signal.

17. An ultrasonic liquid level measurement device for detecting ultrasonic echoes reflected through air from a liquid interface therewith from liquid residing within a solid floored confinement comprising:
an ultrasonic transducer for transmitting ultrasonic signals toward the floor of said confinement;
a receiver responsive to reflected ultrasonic signals to produce an electrical echo signal;
oscillator means connected to said receiver and to said transducer for generating electrical timing signals during a measurement interval;
adjustable discriminator means connected to said oscillator means to count timing signals to generate a maximum liquid level signal and a minimum liquid level signal corresponding respectively to manually adjustable minimum and maximum ultrasonic signal transmission and reflection times;
echo signal registration means connected to said discriminator means and to said oscillator means for counting timing signals during the interval between said maximum level signal and said echo signal, and for registering the timing signal count accumulated therebetween as a portion of the interval between said maximum and minimum ultrasonic signal transmission and reflection times;
indicator means connected to said echo signal registration means to transform said timing signal count accumulated in said echo signal registration means to a perceptable indication of liquid level;
electrical cable means coupling said ultrasonic transducer to said oscillator means, and
compensation means interposed between said ultrasonic transducer and said oscillator to automatically stabilize attenuation of electrical signal propogation through said electrical cable means.

18. An ultrasonic level flow detector for measuring the depth of a flowing fluid in a channel comprising:
ultrasonic transducer means mounted above said channel for transmitting ultrasonic signals toward said channel and for receiving reflected ultrasonic therefrom;
receiving means for detecting ultrasonic signals received by said ultrasonic transducer means;
a delay circuit connected to said receiving means and to said ultrasonic transducer means for establishing a minimum delay between the transmission of successive ones of said ultrasonic signals toward said channel;

echo signal registration means coupled to said receiver for registering the occurrence of an echo signal;

indicator means connected to said echo signal registration means for expressing the occurrence of said echo signal as an indication of fluid flow level; and adjustable discriminator means connected to said echo signal registration means to provide a maximum level signal at a minimum signal transit and reflection time and a minimum level signal at a maximum signal transit and reflection time, and to gate said echo signal registration means to receive an echo signal only during the interval therebetween.

* * * * *